(12) United States Patent
Fleck

(10) Patent No.: US 6,797,354 B2
(45) Date of Patent: Sep. 28, 2004

(54) PATCH SYSTEM AND METHOD

(76) Inventor: James J. Fleck, 570 N. Lakeshore Dr., Brick, NJ (US) 08723

( * ) Notice: Subject to any disclaimer, the term of this patent is extended or adjusted under 35 U.S.C. 154(b) by 0 days.

(21) Appl. No.: 10/053,030

(22) Filed: Jun. 5, 2002

(65) Prior Publication Data

US 2003/0228438 A1 Dec. 11, 2003

(51) Int. Cl.[7] .................................................. B32B 3/26
(52) U.S. Cl. ..................... 428/63; 428/317.1; 428/317.3
(58) Field of Search ............................... 428/63, 317.1, 428/317.3

(56) References Cited

U.S. PATENT DOCUMENTS

| | | | |
|---|---|---|---|
| 941,047 A | * | 11/1909 | Shelton |
| 3,380,213 A | * | 4/1968 | Hartman et al ................ 52/309 |
| 4,469,733 A | * | 9/1984 | Seddon ........................ 428/109 |
| 5,290,620 A | * | 3/1994 | Shono ......................... 428/120 |
| 6,071,833 A | * | 6/2000 | D'Alisa et al. ................ 442/42 |

* cited by examiner

*Primary Examiner*—Daniel Zirker
(74) *Attorney, Agent, or Firm*—Lerner, David, Littenberg, Krumholz & Mentlik, LLP

(57) ABSTRACT

According to one or more embodiments of the invention, a patch system and method are provided that includes rigid polystyrene foam a plug material including an adhesive backing. The patch system and method can be used to patch holes in walls, ceilings and floors.

9 Claims, 1 Drawing Sheet

PATCH SYSTEM AND METHOD

FIELD OF THE INVENTION

This invention relates to a patch for walls, ceilings and floors and a method for patching walls, ceilings and floors.

BACKGROUND OF THE INVENTION

A common problem is the need to quickly and effectively repair a hole or damaged area in a wall, ceiling or a floor of a building such as a home, office or other structure. Existing methods are labor-intensive and expensive.

It would be advantageous to provide a patch system and methods for patching holes in walls, ceiling or floors that require less labor and materials than presently existing methods.

SUMMARY OF THE INVENTION

According to one or more embodiments of the invention, a patch system is provided that includes a plug made of foamed rigid polystyrene material including an adhesive backing. According to certain embodiments, a method of patching a hole is provided comprising at least selecting a patch system including a plug made of foamed rigid polystyrene material and an adhesive backing, inserting the plug into the hole and applying the adhesive backing to the area surrounding the hole.

BRIEF DESCRIPTION OF THE DRAWINGS

A more complete appreciation of the subject matter of the present invention and the various advantages thereof can be realized by reference to the following detailed description in which reference is made to the accompanying drawings.

DETAILED DESCRIPTION OF THE PREFERRED EMBODIMENTS

Figure 1:
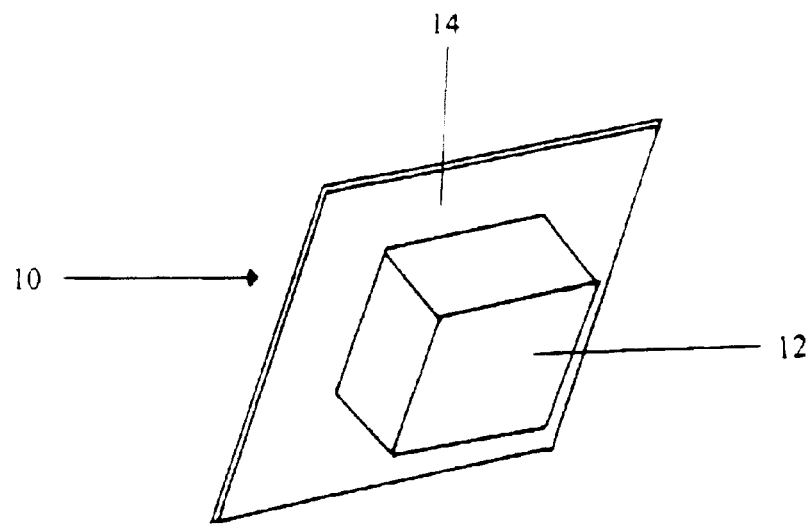
FIG. 1 is a perspective view of a patch system according to one embodiment of the present invention.
Figure 2:
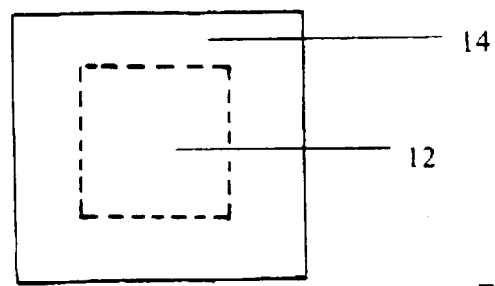
FIG. 2 a top plan view of the patch system shown in FIG. 1.
Figure 3:
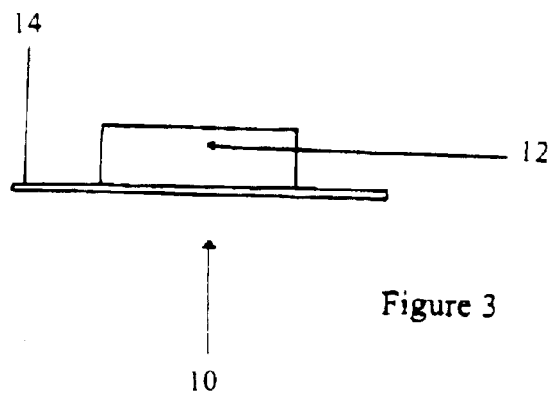
FIG. 3 is a side view of the patch system shown in FIG. 1.

One or more embodiments of the present invention provide a patch system and method for patching holes in ceilings, walls and floors. Turning now to the drawings and particularly to FIGS. 1–3, a patch system is shown generally by reference numeral 10. The patch system 10 includes a plug material 12 adapted to be placed in a hole and an adhesive backing 14 in contact with the plug 12 such that the adhesive backing is adhere to the plug surrounds the periphery of the hole. The plug material 12 is made from Styrofoam ® which is the trademark for a rigid polystyrene foam. According to certain preferred embodiments, the plug material 12 is fireproof. The plug material 12 is pro-molded, and the plug 12 can be sized in depth and shape to fit various sized holes. The adhesive backing 14 preferably includes a flexible material such paper with an adhesive backing or Mylar® film.

One or more embodiments of the invention solves a common problem in the construction and maintenance of buildings such as homes and offices. Given the simplicity and ease of use individuals in the plumbing, electrical, sheetrock trades as well as individuals can use the patch system according to the present invention.

As noted above, the patch system can be supplied in a variety of sizes. Examples of available sizes are from ½" up to and including 6". Each size also is made in a manner such that the patch system be easily modified and or trimmed to precisely fit in different sized holes. Thus, each size is capable of being easily modified if necessary to fit the repaired hole precisely and quickly. According to one or more embodiments, the patch system can be easily applied to a damaged area using the self-adhesive backing. The patch system and method according to the present invention saves labor and time and also but allows the average homeowner to easily make the necessary repair.

The patch system according to one or more embodiments fills the need for a fast, quick, easy and permanent repair to any wall, ceiling and or flooring surface. In use, one would simply find the correctly sized patch for the hole that has to be repaired, peel the backing off the self adhesive material, and simply insert the plug in the center of the adhesive patch into the hole to be repaired. The self-adhesive backing attaches firmly to the surface surrounding the patched hole. The patch job can then be finished as necessary using spackling or finishing whatever material is desired for the particular surface. The patch system of the present invention is easily applied to the damaged area using the self-adhesive backing.

The patch system of the present invention has a self adhesive backing for easy use and a lightweight foam plug such as a rigid polystyrene foam plug in the center that can be easily shaped to precisely fit the damaged hole precisely. The present invention substantially reduces the time and labor required to patch holes in walls, ceilings and floors without having to replace the damaged area. Thus, according to one or more embodiments of the present invention a substantially one step repair patch system and method are provided. The plug material provides is strength and support to the repaired area. The patch system and method can be used for any repair in all types of construction/carpentry, including but not limited to any wall, ceiling and or floor.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims and there equivalents.

What is claimed is:

1. A patch system comprising a plug made of rigid polystyrene foam sized and shaped to fit into and repair a hole in a wall, ceiling or floor and to provide strength and support to the repaired area, the plug material adhesively affixed to an adhesive backing.

2. The patch system of claim 1, wherein the plug material is fireproof.

3. The patch system of claim 1, wherein the adhesive backing includes paper and adhesive.

4. The patch system of claim 3, wherein the adhesive backing is self-adhesive.

5. The patch system or claim 1, wherein the plug is sized to fit in holes having an opening between ½ inch and 6 inches.

6. A method of patching a hole in a wall, ceiling or floor comprising:

providing a patch system including a plug made of rigid polystyrene foam adhesively affixed to an adhesive backing;

selecting a patch system having a plug sized and shaped to fit into the hole;

placing the plug in the hole; and sealing the adhesive backing around the hole.

7. The method of claim 6, wherein the plug is sized between ½ inch and 6 inches.

8. The method of claim 6, further comprising sizing the plug to fit into the hole.

9. The method of claim 8, further comprising shaping the plug to fit in the hole.

* * * * *